3,304,156
CATALYTIC CHLORINATION OF BERYLLIUM
FROM THE ORE
Hung Kei Henry Lam, San Pablo, and Harold T. Fullam, Oakland, Calif., assignors to Stauffer Chemical Company, New York, N.Y., a corporation of Delaware
No Drawing. Filed Aug. 27, 1962, Ser. No. 219,766
10 Claims. (Cl. 23—87)

The present invention relates to a process for the chlorination of beryllium ores.

More particularly, the present invention relates to the chlorination of beryl, phenacite, bertrandite and similar ores containing beryllium using a dual catalyst system.

The prior art processes do not employ the dual catalyst system of the present invention and thus these processes of the prior art require appreciably higher temperatures to effect a given degree of chlorination or, conversely, appreciably longer reaction times are required.

Generally speaking, the prior art processes involved pulverizing the beryllium containing ore, mixing the pulverized ore with a carbonaceous binding material and sodium or calcium chloride and briquetting the mixture. Such briquettes were then contacted with chlorine at elevated temperatures and after relatively long periods of time the beryllium values in the ore were converted to $BeCl_2$. For example, one investigator reported that 80–90% $BeCl_2$ recovery was obtained, but only after ore-carbon briquettes were chlorinated for five hours at 1000° C.

On the other hand, by using the dual catalyst of the present invention intimately mixed with carbon and pulverized ore and pelletized or briquetted, the reaction rate of the chlorination reaction is substantially increased. Conversely, significantly lower temperatures may be used in the ore chlorination reaction to obtain equivalent conversions when the dual catalyst, alkali metal chloride or alkaline earth chloride and alkali metal fluoride or alkaline earth fluoride is employed.

In greater detail, the present invention involves intimately mixing and pelletizing finely ground beryllium ore, carbon, an alkali metal chloride or an alkaline earth chloride, and an alkali metal fluoride or alkaline earth fluoride. The pellets of this mixture may be made with or without a binding agent.

The weight percent of the various ingredients in the pelleted mixture may vary widely. The carbon present in the pellets, however, should be at least the stoichiometric amount needed to combine with the oxygen in the beryllium containing ore. When beryl is the ore employed, the stoichiometry of the reaction is as follows:

$$3BeO \cdot Al_2O_3 \cdot 6SiO_2 + 18C + 18Cl_2 \rightarrow 3BeCl_2 + 2AlCl_3 + 6SiCl_4 + 18CO$$

Actually, a slight excess of carbon over this amount is desirable so as to assure complete reduction.

It is preferred that approximately 1 part by weight of the alkali metal or alkaline earth fluoride be used per 20 parts beryl ore and the weight of alkali metal or alkaline earth chloride used be approximately 60% of the weight of beryl ore used in making the pellets.

After the pellets have been made, they are placed in a low temperature oven and any volatiles are driven off. These preformed pellets are then chlorinated with elemental chlorine or a suitable chlorinating agent, such as phosgene or carbon tetrachloride, at temperatures ranging from 520° C., the boiling point of $BeCl_2$, to approximately 1500° C. which is slightly below the fusion or sintering temperature of the carbon-beryl mixtures. The temperature range of 600° C.–950° C. is the preferred range since adequate conversion and rapid reaction rates are obtained in this lower temperature range when using the dual catalyst. This reaction can be carried out in any type of reactor having a chlorine feed, adequate temperature control means, and a means for collecting the formed $BeCl_2$. For example, the apparatus shown and described in U.S. Patent 2,789,880 may be used in carrying out the present invention. If $AlCl_3$ and $BeCl_2$ or $AlCl_3$, $BeCl_2$ and $SiCl_4$ are the collected reaction products, they may be separated by distillation, solvent extraction or any of the other known methods.

*Example 1*

The preferred dual catalyst for carrying out the present invention is KCl and NaF.

This example illustrates the increased reactivity when using the dual catalyst of the present invention. Beryl ore of the following composition was used in these runs:

| | Percent |
|---|---|
| BeO | 12 |
| $Al_2O_3$ | 18.5 |
| $SiO_2$ | 66 |
| Others | Remainder |

The ore was ground to pass through a 100-mesh screen in a rod mill. The ground ore was then mixed with a little water, lamp black or other reagents and pressed into pellets. The pellets were then dried in a 160° C. oven overnight. A weighed amount of the dried pellets were then placed inside a horizontal or vertical reactor and heated to 650–900° C. under a nitrogen atmosphere. Chlorine was then introduced into the reactor at 3.1 gm./min. for ½–3 hours. The reaction products with the exception of $SiCl_4$ were condensed and collected. The recovered reaction products were then leached with water and the resulting solution analyzed for Be values. The soluble beryllium found in the solution, when compared with the Be content of the ore used in the reaction, would then give the recovery figures reported below:

| Pellet Composition | Wt. Ratio of Pellet Mixture | Temp., °C. | Time (hrs.) | Percent Be Recovery |
|---|---|---|---|---|
| Beryl plus C plus Sugar binder | 40:12:12 | 700–800 | 2 | 0.2 |
| Beryl plus C plus NaCl | 50:15:50 | 750 | 1 | 13.7 |
| Beryl plus C plus KCl | 50:15:50 | 650–800 | 3 | 47.0 |
| Beryl plus C plus NaCl plus NaF | 50:15:50:2.5 | 700–900 | ½ | 76.0 |
| Beryl plus C plus KCl plus NaF | 50:15:50:2.5 | 750 | 2½ | 68.6 |

Carbon content on the above runs was less than stoichiometric quantities.

*Example 2*

This example demonstrates the effect of carbon stoichiometry and types of carbon used upon the $BeCl_2$ recovery. The procedure and apparatus used are the same as mentioned previously.

| Pellet Composition | Wt. Ratio of Pellet Mixture | Temp., °C. | Time, (hrs.) | Percent Be Recovery |
|---|---|---|---|---|
| Activated Carbon plus Beryl plus KCl plus NaF | 15:50:50:2.5 | 800 | 1 | 89 |
| Do | 20:50:50:2.5 | 800 | 1 | 92.5 |
| Lamp Black plus Beryl plus KCl plus NaF | 15:50:50:2.5 | 750 | 2½ | 68.6 |
| Do | 20:50:50:2.5 | 800 | ½ | 82.0 |
| Do | 20:50:50:2.5 | 800 | 1 | 86.0 |
| Do | 25:50:50:2.5 | 800 | 1 | 88.2 |

*Example 3*

This example illustrates the effect of varying the weight percent of the chloride catalyst used. The study was made in which pellets were prepared with beryl ore, carbon (slight excess) and NaF content being held constant while varying only the KCl content. Five batches of pellets were made, each with 50 grams of ore, 40% carbon, 5% NaF but which contained 10, 20, 30, 40 and 50 grams of KCl respectively. The chlorination conditions were the same for each batch of pellets and the results are given below:

| KCl/Ore (wt. ratio) | Temp. (° C.) | Time (hrs.) | Percent Be Recovery |
|---|---|---|---|
| 1/5 | 750 | 1 | 67 |
| 2/5 | 750 | 1 | 72 |
| 3/5 | 750 | 1 | 84 |
| 4/5 | 750 | 1 | 76 |
| 1/1 | 750 | 1 | 75.5 |

*Example 4*

Phenacite ($2BeO \cdot SiO_2$) and Bertrandite ($2BeO \cdot SiO_2 \cdot 2H_2O$)

ores were also tested with and without the dual catalyst of the present invention. The ores were pelletized in the same manner and the composition used are shown below.

Bertrandite (24% BeO):
  Batch I—Ore 25 g., carbon 20 g., sugar 10 g., pitch 10 g.
  Batch II—Ore 25 g., carbon 20 g., KCl 25 g., NaF 1.3 g., pitch 10 g.

Phenacite (22.8% BeO):
  Batch I—Ore 25 g., carbon 20 g., sugar 10 g., pitch 10 g.
  Batch II—Ore 25 g., carbon 20 g., KCl 25 g., NaF 1.3 g., pitch 10 g.

These four batches of pellets were chlorinated at 800° C. for one hour and the results obtained are reported below:

Run: Percent Be recovery
  (I) Bertrandite (no catalyst) _____ 63.7
  (II) Bertrandite (with catalyst) _____ [1]67.6
  (III) Phenacite (no catalyst) _____ 73.0
  (IV) Phenacite (with catalyst) _____ 89.3

[1] Low result due to partial loss of sample.

Ore chlorinations have been made by practicing the present invention at temperatures of approximately 900° C. which have resulted in yields of greater than 95%.

Many variations in the instant process are readily evident to those skilled in the art and, thus, the scope of the present invention should be limited only by the appended claims.

We claim:
1. A method of catalytically chlorinating a beryllium containing ore selected from the group consisting of beryl, bertrandite and phenacite comprising: forming an intimate mixture of ore and carbon containing a catalytic amount of a dual catalyst comprising a material selected from the group consisting of alkali metal chlorides and the alkaline earth chlorides and a material selected from the group consisting of alkali metal fluorides and alkaline earth fluorides, heating said mixture to a temperature in the range of 520° C. to 1500° C. and then contacting said heated mixture with a chlorinating agent and collecting the $BeCl_2$ so formed.

2. A method of catalytically chlorinating a beryllium containing ore selected from the group consisting of beryl, bertrandite and phenacite comprising: forming an intimate mixture of ore and carbon containing catalytic amounts of potassium chloride and sodium fluoride, heating said mixture to a temperature in the range of 520° C. to 1500° C. and then contacting said heated mixture with a chlorinating agent and collecting the $BeCl_2$ so formed.

3. A method of catalytically chlorinating a beryllium containing ore selected from the group consisting of beryl, bertrandite and phenacite comprising: forming an intimate mixture of pulverulent ore and carbon containing catalytic amounts of sodium chloride and sodium fluoride, heating said mixture to a temperature in the range of 520° C. to 1500° C. and then contacting said heated mixture with chlorine and collecting the $BeCl_2$ so formed.

4. A method of catalytically chlorinating a beryllium containing ore selected from the group consisting of beryl, bertrandite and phenacite comprising: forming an intimate mixture of pulverulent ore and carbon containing a catalytic amount of a dual catalyst comprising a material selected from the group consisting of alkali metal chlorides and the alkaline earth chlorides and a material selected from the group consisting of alkali metal fluorides and alkaline earth fluorides, heating said mixture to a temperature in the range of 600–950° C. and then contacting said heating mixture with chlorine and collecting the $BeCl_2$ so formed.

5. A method of catalytically chlorinating a beryllium containing ore selected from the group consisting of beryl, bertrandite and phenacite comprising: forming an intimate mixture of pulverulent ore and carbon containing catalytic amounts of potassium chloride and sodium fluoride, heating said mixture to a temperature in the range of 600–950° C. and then contacting said heated mixture with chlorine and collecting the $BeCl_2$ so formed.

6. A method of catalytically chlorinating a beryllium containing ore selected from the group consisting of beryl, bertrandite and phenacite comprising: forming an intimate mixture of pulverulent ore and carbon containing catalytic amounts of sodium chloride and sodium fluoride, heating said mixture to a temperature in the range of 600–950° C. and then contacting said heated mixture with chlorine and collecting the $BeCl_2$ so formed.

7. A method of catalytically chlorinating a beryllium containing ore selected from the group consisting of beryl, bertrandite and phenacite comprising: forming an intimate mixture comprising 1 part pulverized ore, carbon in an amount sufficient to combine with all of the oxygen present in said ore, 0.6 part of a material selected from the group consisting of the alkali metal chlorides and the alkaline earth chlorides, and 0.05 part of a material selected from the group consisting of the alkali metal fluorides and the alkaline earth fluorides, heating said mixture to a temperature in the range of 600–950° C., contacting said heated mixture with chlorine and collecting the $BeCl_2$ so formed.

8. A method of catalytically chlorinating a beryllium containing ore selected from the group consisting of beryl, bertrandite and phenacite comprising: forming an intimate mixture comprising 1 part pulverized ore, carbon in an amount sufficient to combine with all of the oxygen present in said ore, 0.6 part potassium chloride and 0.05 part sodium fluoride, heating said mixture to 600–950° C., contacting said heated mixture with chlorine and collecting the $BeCl_2$ so formed.

9. A method of catalytically chlorinating a beryllium containing ore selected from the group consisting of beryl, bertrandite and phenacite comprising: forming an intimate mixture comprising 1 part pulverized ore, carbon in an amount sufficient to combine with all of the oxygen present in said ore, 0.6 part sodium chloride and 0.05 part sodium fluoride, heating said mixture to 600–950° C., contacting said heated mixture with chlorine and collecting the $BeCl_2$ so formed.

10. A method of chlorinating beryl ore to form $BeCl_2$ comprising: forming an intimate mixture comprising 1 part pulverized beryl ore, 0.6 part potassium chloride, 0.05 part sodium fluoride and sufficient carbon to react with the oxygen present in the beryl ore, pelletizing said mixture, heating said pellets to a moderate temperature to remove any volatiles therein, thereafter heating said pellets to a temperature of 600–950° C. and contacting said pellets with chlorine and collecting the $BeCl_2$ so formed.

References Cited by the Examiner
UNITED STATES PATENTS

| | | | |
|---|---|---|---|
| 1,392,045 | 9/1921 | Booth et al. | 23—24.2 |
| 2,387,203 | 10/1945 | Willmore et al. | 75—84.4 X |
| 2,387,205 | 10/1945 | Willmore et al. | 75—84.4 X |

OSCAR R. VERTIZ, *Primary Examiner.*

BENJAMIN HENKIN, *Examiner.*

E. STERN, *Assistant Examiner.*